Sept. 20, 1949.   M. A. CHAVANNES ET AL   2,482,094
PROCESS OF PRODUCING FILMS BEARING DESIGNS
Filed July 8, 1946   4 Sheets-Sheet 1

INVENTORS
MARC A. CHAVANNES
ARTHUR B. SHERRY
BY
ATTORNEY

Sept. 20, 1949.  M. A. CHAVANNES ET AL  2,482,094
PROCESS OF PRODUCING FILMS BEARING DESIGNS
Filed July 8, 1946  4 Sheets-Sheet 2

INVENTORS
MARC A. CHAVANNES
ARTHUR B. SHERRY
BY
ATTORNEY

Sept. 20, 1949.    M. A. CHAVANNES ET AL    2,482,094
PROCESS OF PRODUCING FILMS BEARING DESIGNS
Filed July 8, 1946    4 Sheets-Sheet 3

INVENTORS
MARC A. CHAVANNES
ARTHUR B. SHERRY
BY
ATTORNEY

Sept. 20, 1949.   M. A. CHAVANNES ET AL   2,482,094
PROCESS OF PRODUCING FILMS BEARING DESIGNS
Filed July 8, 1946   4 Sheets-Sheet 4

INVENTORS
MARC A. CHAVANNES
ARTHUR B. SHERRY
BY
ATTORNEY.

Patented Sept. 20, 1949

2,482,094

UNITED STATES PATENT OFFICE 2,482,094

PROCESS OF PRODUCING FILMS BEARING DESIGNS

Marc A. Chavannes, Lisbon, and Arthur B. Sherry, Hartford, Conn., assignors, by direct and mesne assignments, to Chavannes Industrial Synthetics, Inc., New York, N. Y., a corporation of Delaware Application July 8, 1946, Serial No. 681,780

21 Claims. (Cl. 18—57)

This invention relates to a method of producing films of resinous material.

It has particular reference to the production of films having certain smooth-surfaced portions and certain undulated-surfaced portions. The invention is especially applicable in the production of self-supporting plastic films, especially those made from a dispersion including a vinyl resin. In those regions having an undulated surface, the appearance may vary widely in form, since the film may exhibit fine or coarse undulations, a frosted appearance, or other ornamental and useful effects in intaglio and relief. In such regions the film may appear to sparkle or scintillate. In those regions not having an undulated surface, the film will be quite smooth and glossy.

In pending patent application Serial No. 635,982, filed December 19, 1945, in the names of Marc A. Chavannes and George T. Traut, inventors, means were described for producing a film having one face entirely undulated, and also for producing a film having a face undulated in only certain regions. The present invention describes a greatly improved method for producing a novel type of film having undulations in only certain regions.

A feature of the present invention is that films having unusually sharply defined patterns may thereby be produced.

An important object of the present invention is to produce a film having undulations in a designed area on one face, and having embedded in the other face a contrastingly colored portion of film-like material, the outlines of this portion corresponding to the outlines of the undulated area.

A further important object is to produce a film having undulations of varying degree in different regions on one side. A feature of one embodiment of such a film is that the film may be so colored, by means of a plurality of colored segments of film-like material embedded in the reverse side thereof, that the portions of the film having the more pronounced undulations appear to be more deeply colored.

Further objects, features and advantages will appear from the more detailed description set forth below by way of illustration, which will now be given in conjunction with the accompanying drawings in which.

Reference is made to the above-mentioned pending application Serial No. 635,982, filed in the names of Marc A. Chavannes and George T. Traut, inventors, for a general discussion of means for producing undulated film, and various substances from which such film may be formed. The present invention may be briefly described as follows. In the present example it may be assumed that a film is to be formed on a continuously advancing carrier from a dispersion of a resin in a fluid vehicle. More specific details of satisfactory dispersions will be given at a later point. In one embodiment of the invention a carrier is first prepared so as to provide a smooth surface on which the film may be formed, and from which the finished film may be readily stripped, but so as to be quite absorbent for the vehicle of the dispersion. The preparation of such a carrier may include the application to an absorbent carrier web of a layer of a smooth, hard, flexible, relatively porous substance which will adhere to the web but will not firmly adhere to the finished film. A relatively non-absorbent ink or other film-forming substance is then applied to certain regions of the carrier, the shape of said regions conforming to some desired design. Such regions are thereby rendered less absorbent for the vehicle of the dispersion than other regions. A continuous layer of the dispersion is then applied over the design. The carrier, bearing its porous layer, the design, and the dispersion is then exposed to a controlled temperature for a short period of time. In regions where the relatively non-absorbent ink was not applied, a certain amount of the vehicle will be absorbed into the carrier, and into the porous layer itself. In regions where it was applied, less of the vehicle will be so absorbed. A fluid swelling agent is then applied to the entire upper surface. The proportion of vehicle present is one controlling factor in determining the results of the application of a swelling agent, and since in different areas the dispersion is in a different condition with regard to the proportion of vehicle present, different effects will be produced in such areas. As a result, undulations will be produced on the upper surface in the region corresponding to those where ink was applied to the carrier, but other regions will become highly smooth and glossy. The carrier web, bearing the absorbent layer, the ink, and the film, is then passed through a drying and fusing oven, after which the film is stripped from the absorbent layer, which adheres to the carrier. The non-absorbent ink may adhere to the film and be embedded therein, in which case the lower surface of the film will be smooth. In certain embodiments of the invention the ink may adhere to the absorbent layer and leave an indented region in the film.

Figures 1, 2, 3, 4, 5:
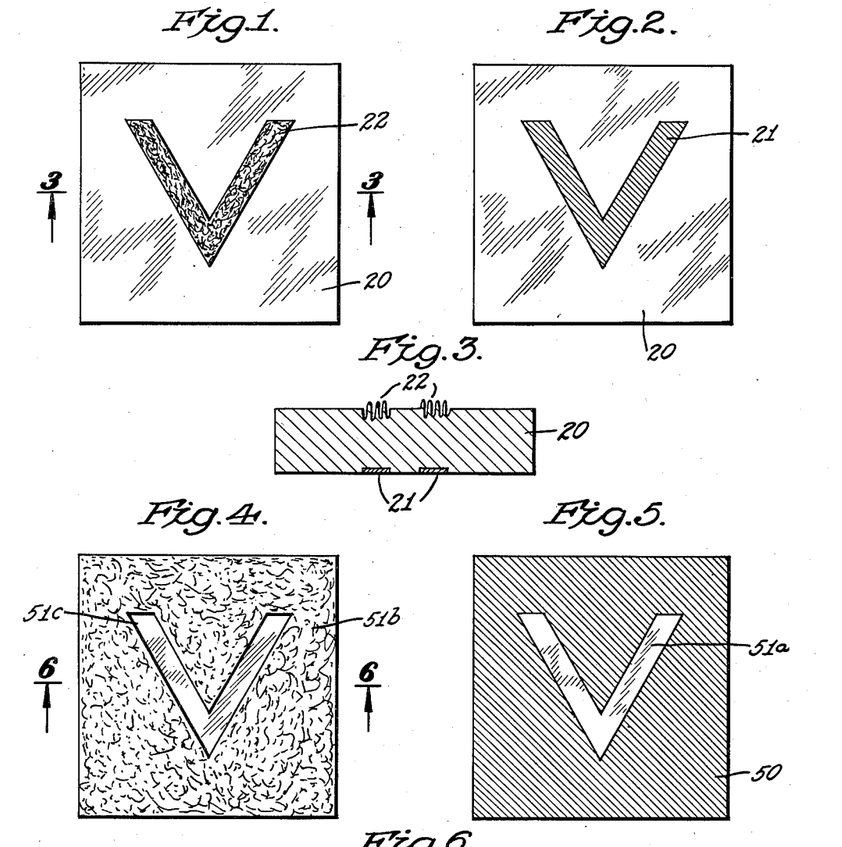
Fig. 1 is a plan view of a face of a film which is smooth and glossy in most areas but which is undulated in an area corresponding with a desired design, in this case, the letter V.
Fig. 2 is a plan view of the reverse side of the film shown in Fig. 1, bearing a solid embedded colored V design corresponding to the undulated design on the other side.
Fig. 3 is a cross-sectional view of the film shown in Figs. 1 and 2, the thickness of the film being exaggerated for clarity of illustration.
Fig. 4 is a plan view of one side of the film, having a smooth V design with an undulated background.
Fig. 5 is a plan view of the reverse side of the film shown in Fig. 4, having a smooth V with a colored, embedded background.

A more detailed example illustrating the teachings of the present invention may be described as follows:

It may first be assumed that it is desired to produce a film such as that illustrated in Figs. 1–3. Such a film will have a main supporting portion 20 and a colored design portion 21 embedded in one face thereof, as shown in Fig. 2, the opposite face being undulated in an area 22 opposite said embedded design portion, as shown in Figs. 1 and 3. It is to be understood that in Fig. 3, as in various other cross-sectional views in this application, the thickness of the film has been considerably exaggerated for clarity of illustration.

Figure 11:
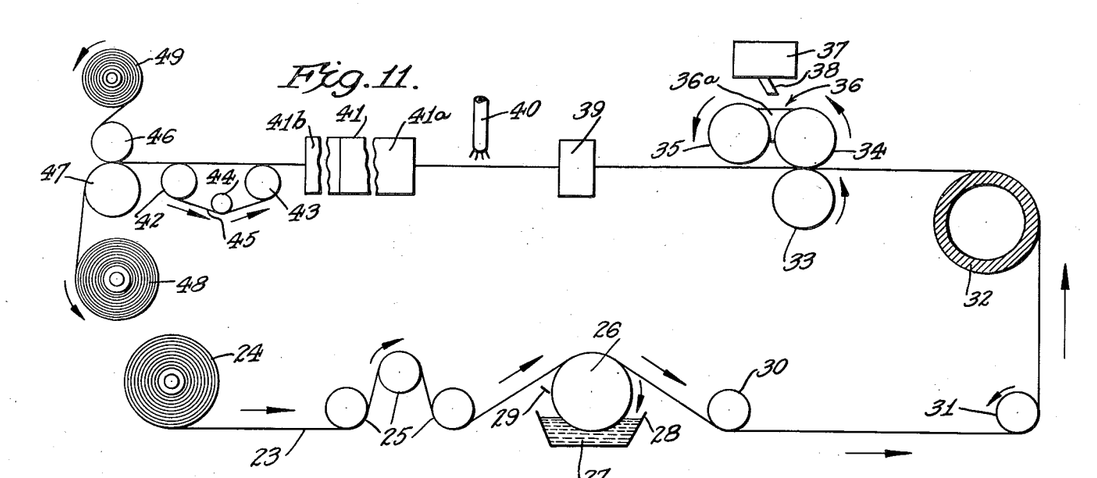
Fig. 11 is a schematic elevational view of apparatus for producing films such as those illustrated in Figs. 1–10.

Reference is made to Fig. 11, which is a view in side elevation of apparatus which may be used for producing such a film. The apparatus makes use of a continuously advancing carrier 23, upon which the film will be formed. It is assumed that prior to use in the apparatus shown in Fig. 11, the carrier has been prepared in accordance with the teachings of the present invention. One type of satisfactory carrier may be formed by applying to a base web of heavy absorbent paper one or more substances forming a first group including varnish, nitrocellulose, lacquer, pyroxylin, casein, glycerine, polyvinyl alcohol, shellac, other gums and the like, in order to provide the previously mentioned qualities of smoothness, hardness and flexibility, and one or more substances from a second group including such substances as clay, chalk, activated carbon, aluminum oxide and other absorbent material, in order to give the coating the desired quality of porosity. The specific substances mentioned are illustrative only, and various other substances may satisfactorily be used.

One example of a satisfactory coating for an absorbent paper web is the following mixture:

| | Parts |
|---|---|
| Clay | 26.5 |
| Casein | 49.0 |
| Glycerine | 24.5 |

The carrier may be in the form of a web, as in the illustration, being unwound from one reel and wound up on another reel after being used, or could be in the form of an endless belt.

The carrier 23 may be carried by a reel 24 and is drawn from this reel by means to be described at a later point. In the illustrated apparatus, if the carrier has a porous coating on only one side, this coating should be on the lower side of the carrier as it unwinds from the reel 24. After leaving this reel, the carrier passes through a series of tensioning rollers 25. It then passes over an engraved printing roller 26 which may conveniently be mounted so as to be partly submerged in a non-absorbent ink or similar substance 27 held in a container 28. It is to be understood that a variety of printing means other than this one illustrated may be used satisfactorily.

Figure 12:
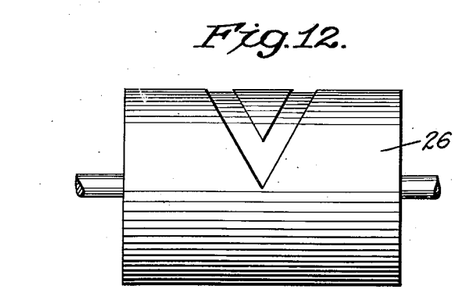
Fig. 12 is a plan view of one of the rollers which may be used in the apparatus shown in Fig. 11 to produce a film such as that shown in Figs. 1–3.

If a film such as that shown in Figs. 1–3 is to be formed, the roller 26 may have the form shown in Fig. 12. The roller will have a single channel corresponding to each arm of the V. At a later point, modifications will be described wherein each arm might be represented by a multiplicity of smaller channels, as in a line cut, and other arrangements are also possible.

The substance 27 may be of a wide variety of compositions. In general it may be a resin-like, paint-like, lacquer-like, rubber-like or ink-like substance. It should generally have film-forming properties, and may be a dispersion, emulsion or solution of almost any film-forming substance which may be put into a fluid or liquid state, such as vinyl resins, cellulose derivatives, natural or synthetic rubbers, waxes and paraffins, polyamides, and the like. It may include a solvent, such as methyl ethyl ketone, methyl isobutyl ketone, cyclohexanone, acetone, or a mixture of these solvents, with or without a diluent such as xylol or the like. A plasticizer may be used or not, as desired. The plasticizer may, for example, include dioctyl phthalate, dibutyl sebacate, castor oil, or the like. Fillers and pigmenting agents may be added if desired. The term "pigmenting agent" as used in the present application will be understood to cover dyes, phosphorescent and fluorescent materials, metallic flakes, other coloring material, opaque material such as carbon black and chalk, and the like. When a substance such as 27, prepared as indicated, is applied to a region of an absorbent, coated carrier of the type described above, it will generally render such region less absorbent.

For convenience, the substance 27 may be referred to as a non-absorbent ink or as a film-forming substance, with the understanding that it may have possible variations in composition as described above. In many cases this substance will differ in composition from the substance of which the main portion of the film is formed only by the addition of a coloring material to one of them, and in some cases there may be no difference at all.

The adhesive qualities of the non-absorbent ink should be carefully considered. Thus if it is desired that the design to be formed from this substance remain embedded in the supporting portion of the film, then this substance should be so chosen that it does not adhere firmly with the porous coating on the carrier, but does adhere firmly or become integrally bonded with the substance from which the main or supporting portion of the film is to be formed. On the other hand, if it is desired that the design formed from this ink serve merely to produce the undulations in the film, and not become attached to the film, then it should be so chosen in relation to the coated carrier that the design will adhere to the carrier surface and will not adhere firmly with the film.

An example will now be given of a satisfactory non-absorbent ink which is white in appearance and which, when used in connection with a paper carrier provided with an illustrative coating described above, will not firmly adhere to the coated carrier. Such an ink may comprise a vinyl resin such as a copolymer of vinyl acetate and vinyl chloride, for example, the product of Carbide and Carbon Chemical Company known as VYNS, or a similar product, a plasticizer such as dioctyl phthalate, a solvent such as methyl ethyl ketone, and a pigmenting material such as titanium dioxide. These substances have satisfactorily been combined in the following proportions:

| | Parts by weight |
|---|---|
| Vinyl acetate-chloride copolymer (VYNS) | 100 |
| Dioctyl phthalate | 33 |
| Methyl ethyl ketone | 1000 |
| Titanium dioxide | 50 |

As the roller 26 rotates in the non-absorbent ink 27, a coating of this substance is applied to this roller. The apparatus is provided with a doctor blade 29, pressed against the roller so as to remove the ink from the roller in areas other than the depressed or engraved regions.

As the carrier 23 passes over the roller 26, this coating of ink is applied to the absorbent layer on the lower surface of the carrier in an area corresponding to the configuration of the desired design. The carrier is then passed under a guide roller 30, which contacts the upper surface of the carrier. It then passes under a guide roller 31. This roller may conveniently be driven so as to aid in advancing the carrier. The specific arrangement for advancing the carrier will of course depend upon the most convenient arrangement of the apparatus.

The carrier is then passed over a heated roller 32, the purpose of which is to dry the design of ink, at least partially. This drying step may in some cases be omitted, if care is taken not to smear the design at later stages in the process. The roller 32 may conveniently be provided with steam pipes which pass longitudinally through same, or with other means for heating the roller. Means other than a warm roller may also be used for this drying step.

The carrier bearing its design may then be passed through a coating apparatus, and a continuous layer of film-forming substance may be formed over the design. The coating apparatus may be of a wide variety of forms other than the one illustrated. In the arrangement shown, the carrier may be drawn or driven by a rubber-coated roller 33, rotating counterclockwise, pressed against its lower side. Cooperating with this roller is a roller 34 pressed against the upper side of the carrier at its line of tangency with the roller 33. The roller 34 has a smooth, preferably metallic surface. As indicated, this roller rotates in a counterclockwise direction so as to oppose the motion of the carrier, but since the roller 33 has a rubber surface and the roller 34 a smooth metallic surface, the roller 33 grips the carrier and advances it to the left, while the surface of the roller 34 is merely wiped across the surface of the coated carrier and design.

A roller 35, preferably of smooth, metallic composition, on the left of roller 34 above the carrier, cooperates with the roller 34 and is adjacent but not tangent thereto, nor is it tangent to the carrier. As indicated, the roller 35 rotates in a counterclockwise direction. A trough 36, partly formed by the rollers 34 and 35, together with means not shown for damming up the ends of the trough, is provided for holding a film-forming substance 36a and applying the same to the roller 34. This film-forming substance may conveniently be supplied to the trough from a mixing vat 37 through a pipe 38.

The film-forming substance 36a will normally comprise a dispersion, emulsion or organosol of a resin in a fluid vehicle. The vinyl resins, especially copolymers of vinyl acetate and vinyl chloride, may satisfactorily be used for this purpose. Thus a satisfactory dispersion may be made from a vinyl acetate chloride copolymer, a plasticizer, and a diluent. The diluent may, as in the specific example given below, comprise a relatively high-boiling diluent and a lower-boiling diluent. The vinyl acetate-chloride copolymer may conveniently be the product of Carbide and Carbon Chemical Corporation known by the trade name VYNV-1, or a similar product. Dioctyl phthalate is a satisfactory plasticizing agent. Xylol, or the similar product, Solvesso, the latter being a trade name of Standard Oil Company of New Jersey, may satisfactorily be used as a relatively high boiling diluent, and as a lower boiling diluent, Apco thinner, a product of the Anderson Pritchard Oil Company, or a similar product, may be used. These substances have been successfully combined in the following ratio:

|  | Parts by weight |
|---|---|
| Vinyl acetate-chloride copolymer (VYNV-1) | 1000 |
| Dioctyl phthalate | 500 |
| Xylol or Solvesso | 200 |
| Apco thinner | 490 |

In a manner well known in the art, to prepare a dispersion of the above substances, the various components are milled together in a ball or pebble mill for a considerable length of time and at a controlled temperature. The time of grinding and the optimum temperature will be determined by the nature and ratio of the components. As an example, grinding for about 24 hours may be necessary, and for some mixtures the temperature should be about 100° F.

It is observed that by passing around the rollers 31 and 32 the orientation of the carrier was reversed so that the porous coating, and the design of absorbent ink, formerly on the lower side of the carrier, is on the upper side as the carrier passes under roller 34. By the cooperation of the rollers 34 and 35, an even coating of dispersion is applied to the roller 34 and is smeared by this roller onto the surface of the carrier over the dried design. The carrier bearing its various coatings may then be exposed to a controlled temperature for a short period of time. In the present example, this is accomplished by passing the carrier through a short oven 39. It might be accomplished by other means, such as those described in the previously-mentioned patent application Serial No. 635,982, or under certain circumstances this exposure to a controlled temperature might be omitted entirely.

The quantitative value of the controlled temperature and duration of exposure of the film-forming substance to such temperature in order to produce the desired undulated effect will depend upon the nature and proportion of the ingredients of the dispersion, the conditions under which the dispersion was milled, the thickness of the layer of the dispersion, the relative humidity, the velocity of any gases passing over the surface of the layer, and other factors. A film made from the illustrative dispersion may satisfactorily be exposed to a temperature between 80° and 150° F. Depending upon the various conditions existing, it is possible to determine a satisfactory temperature and time of exposure. In general, the higher the temperature the shorter the time of exposure necessary. It is to be understood that in some cases temperatures outside the range mentioned may be used.

A specific test was given in the previously-mentioned application 635,982 for determining in an illustrative film a proper condition for producing an undulated effect.

After the exposure to the controlled temperature for the proper length of time, a swelling agent is applied to the dispersion by appropriate means, such as a spray 40, as shown in Fig. 11, or a bath, or other means. This swelling agent may conveniently be applied to the entire upper surface of the dispersion.

Acetone is a preferred swelling agent, and methyl ethyl ketone, cyclohexanone and other solvents or mixtures of solvents having a pronounced swelling effect on the resin particles without appreciable dissolving action are satisfactory. Assuming that the dispersion has been treated properly up to this point, when the swilling agent is applied, undulations or random designs in relief or intaglio will be produced in those regions on the upper surface of the dispersion layer opposite the regions of non-absorbent ink, and in other regions little or no undulations will be produced; instead, in these last mentioned regions the film will become highly smooth and glossy.

One explanation for the effect is that the porous coating provides a number of channels or pores through which the vehicle of the dispersion may be absorbed into the paper which forms the base web of the carrier, and which themselves entrap a certain amount on this vehicle. These channels are in general too small to admit the resin particles of the dispersion. The proportion of vehicle in the dispersion seems to be critical in determining whether an undulated effect or a highly smooth effect will be obtained upon application of a swelling agent. In the process described, it is apparent that in those regions where non-absorbent ink was applied to the carrier, less of the vehicle will be removed from the dispersion by absorption into the carrier than is thus removed in other regions. The difference in vehicle content in the respective regions produces the difference in effect when the swelling agent is applied, as desired.

After application of the swelling agent, the carrier bearing its coatings is dried and fused by being passed through an oven 41 with drying and fusing sections 41a and 41b, respectively.

For advancing the carrier at the point where it emerges from the oven, a suction apron or like means may conveniently be provided. Such an apron may include a driven roller 42, a guide roller 43, an idler roller 44, and a perforated belt 45. The carrier 23 rests on the belt 45 and means not illustrated, such as air pump means, are provided for creating a subatmospheric pressure underneath the belt so that the carrier is sucked or drawn down against the belt. The belt is driven in a generally counterclockwise direction. As shown, it advances the carrier to the left as desired.

The carrier is then passed through a set of cooperating rollers 46 and 47, where the film is stripped from the absorbent coating. The carrier, bearing the absorbent coating, may conveniently be wound upon a reel 48, and the film, bearing the embedded design, may be wound upon a reel 49. The carrier and the film may initially be stripped one from the other by hand and then attached to the reels 48 and 49, respectively. These reels are driven by means not shown at the same linear rate so that proper stripping will occur.

Figure 6:
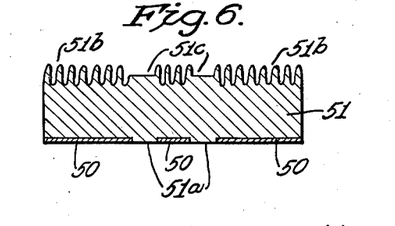
Fig. 6 is a cross sectional view of the film shown in Figs. 4 and 5, the thickness of the film being exaggerated for clarity of illustration, the section being taken in the plane 6—6 indicated in Fig. 4.

A variety of effects are possible by variation in the construction of the roller 26. For example, instead of having an engraved or depressed V-like pattern, it is possible to have on this roller a V in relief, or viewed differently, all portions of the roller may be depressed except for the V. The doctor blade would be so adjusted as to remove the non-absorbent ink or film-forming substance 27 from the V region of the roller, and as a consequence a film such as that illustrated in Figs. 4, 5 and 6 would be produced. The non-absorbent ink would form the major portion of one side of the film as shown at 50. The main body of the film, 51, would have a portion 51a flush with said side corresponding to the design. The film would have on the side opposite the non-absorbent ink and in an area 51b corresponding thereto an undulated surface, and a smooth glossy surface in the remaining V-like area 51c opposite the portion 51a. Thus the design on the film shown in Figs. 4–6 may be considered to be the negative of that on the film shown in Figs. 1–3.

Many other variations of the roller shown in Fig. 12 are possible. Thus it may bear an engraved design in the form of lettering, fine lines such as lacework, a silhouette, a plurality of small designs, or the like. One of the important features of the present invention is the provision of special means for producing undulations of varying degree. If the design of non-absorbent ink or film-forming substance 27 is applied to a plurality of small, spaced areas of the porous layer on the carrier, it is apparent that by varying the aggregate area covered by the non-absorbent ink, it is possible to control the amount of the vehicle absorbed into the carrier. One means of thus controlling the absorption is by the use of a roller on which there is a halftone design. Thus assuming that such an engraved roller will apply to the carrier a multiplicity of similar dots or cones of ink, then there will be more absorption in regions where such dots are spaced far apart than where they are closely spaced.

Figure 7:
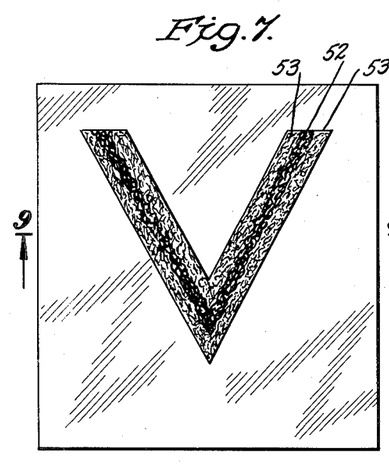
Fig. 7 is a plan view of one face of a film having an undulated pattern in the shape of a V, with a smooth background, the undulations of the pattern being more pronounced toward the center of each arm of the V than toward the edges.
Figure 13:
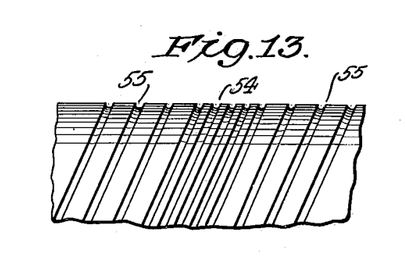
Fig. 13 is an enlarged fragmentary plan view near one edge of a roller, representing a modification of the roller shown in Fig. 12, which may be used to produce a film such as that shown in Figs. 7–10.

Similarly, line-cut patterns may be used on the roller. Thus let it be assumed that it is desired to produce a film such as that illustrated in Figs. 7–10, bearing on one side as shown in Fig. 7 a V-like pattern on a smooth, glossy background, the surface of the film being undulated within the V, and the undulations being more pronounced toward the center of each arm of the V, as at the region 52, than toward the edges of the arms, as at regions 53. Fig. 13 is an enlarged fragmentary plan view of a roller which might satisfactorily be used for producing such a film. This roller, instead of having one large channel for each arm of the V as shown in Fig. 12, has for each arm a plurality of small channels. These channels may conveniently run parallel to the arms of the V. It is noted that Fig. 13 illustrates schematically the channels for one arm, near an edge of the roller. It is observed that the channels are more closely spaced toward the center, such as in region 54 than toward the edges such as in regions 55.

Figure 14:
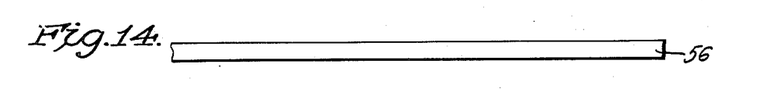
Fig. 14 is a cross-sectional view of a portion of a carrier.
Figure 15:
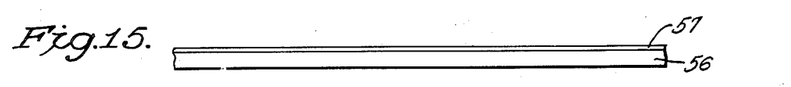
Fig. 15 is a cross-sectional view of a portion of a carrier bearing a porous coating.

Figs. 14–19 illustrate various stages of producing a film such as that shown in Figs. 7–10. Figs. 14 and 15, respectively, show the base web of paper, 56, before and after receiving its porous coating 57, both views being in cross section. It is to be noted that for simplicity in Figs. 14–18, it is assumed that all the various substances are applied to the upper side of the carrier, whereas in the schematic elevational view shown in Fig. 11, the carrier is reversed during the process.

Figure 16:
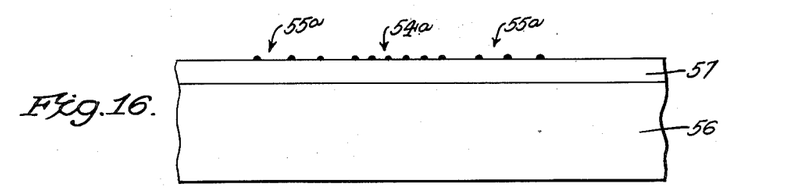
Fig. 16 is a cross-sectional view with exaggerated thickness of a portion of a carrier bearing a porous coating and a series of spaced segments of film-like material such as might be applied to it by a roller of the type shown in Fig. 13.

Fig. 16 is an enlarged cross sectional view of the carrier 56 bearing its porous coating 57, and bearing a plurality of ridge-like segments of non-absorbent ink such as might be applied by the roller shown in Fig. 13. Since the non-absorbent ink is somewhat fluid, it will not retain exactly the shape of the engraved channels of the roller, but will tend to flatten out. It is observed that the ridges of non-absorbent ink are more closely spaced in the region 54a than in the region 55a. It is to be understood that the actual ridges used might be very thin and closely spaced, but the present illustration is simplified for the sake of clarity.

Figure 17:
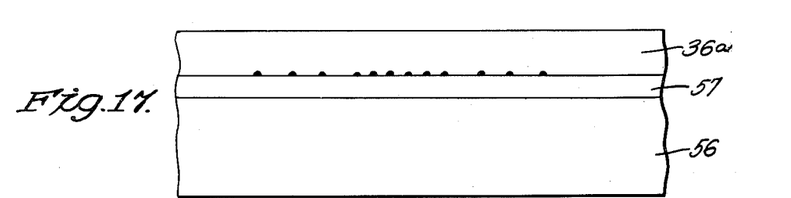
Fig. 17 is a cross-sectional view with exaggerated thickness including the elements shown in Fig. 16, with a layer of a fluid film-forming substance formed thereover.

Fig. 17 illustrates the components shown in Fig. 16 after the non-absorbent ink has been dried and a layer of film-forming substance 36a has been applied over same.

Figure 18:
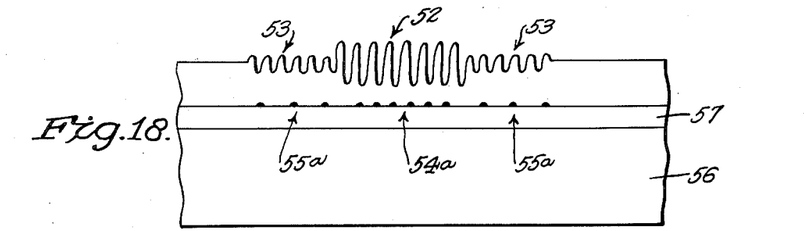
Fig. 18 is a cross-sectional view with exaggerated thickness of the elements shown in Fig. 17 after application of a swelling agent to the film-forming substance and consequent undulation of its surface, illustrating that more pronounced undulation occurs opposite the more closely spaced segments of embedded film-forming substance.
Figure 19:
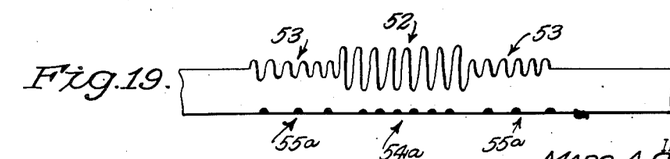
Fig. 19 is a cross-sectional view of a portion of the film shown in Fig. 18 after stripping same from the porous layer on the carrier.

Fig. 18 shows, in enlarged cross section, the components shown in Fig. 17 after application of a swelling agent to the upper surface thereof, and after drying the film. It is to be noted that the more pronounced undulations, in the region 52, occur opposite the closely spaced ridges or segments of non-absorbent ink in the regions 54a, as compared with the less pronounced undulations in regions 53 opposite regions 55a. Fig. 19 shows the film in enlarged cross section, after having been stripped from the absorbent layer on the carrier. The undulated regions 52 and 53 shown in Figs. 18 and 19 correspond to the regions indicated by like numerals in Fig. 7.

Figure 8:
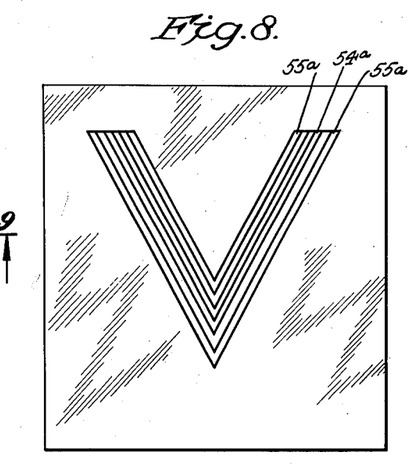
Fig. 8 is a plan view of the reverse side of the film shown in Fig. 7. It has a series of colored segments of film-like material embedded in a smooth background, the segments being more closely spaced toward the center of each arm of the V than toward the edges.
Figure 9:
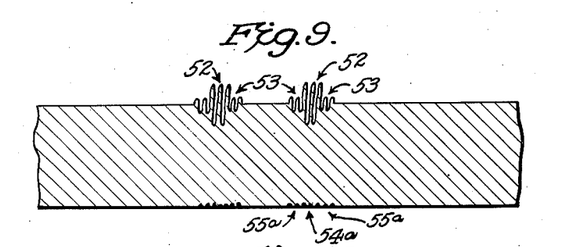
Fig. 9 is a cross sectional view, with exaggerated thickness, of the film shown in Figs. 7 and 8, illustrating the correspondence between the degree of wrinkling and the spacing of the segments embedded in the opposite side, the section being taken in the plane 9—9 indicated in Fig. 7.
Figure 10:
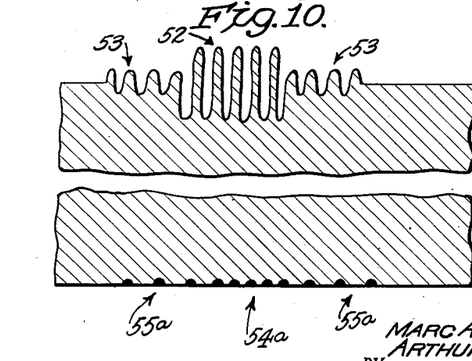
Fig. 10 is an enlarged fragmentary cross sectional view of portions near the surfaces of the film shown in Fig. 9, the view including only one arm of the V.

The side of the film shown in plan view in Fig. 8 bears the previously-mentioned embedded segments of non-absorbent ink or film-forming material in the regions 54a and 55a. Figs. 9 and 10 show in cross section the correspondence between the degree of undulation and the spacing of these segments. The thickness of the film is exaggerated in Fig. 9 and still further exaggerated in Fig. 10, which latter figure shows only portions near the surfaces of one arm of the V. In Figs. 14–19 the section included likewise corresponds to only one arm of the V.

Somewhat similar effects can be obtained by varying the depth of the channel or other engraved portions in roller 26, instead of or in addition to variations in the spacing of such portions. Thus non-absorbent ink from a deep channel will spread out more and protect a larger area of the absorbent carrier than in the case of a shallow channel.

By using coloring material in the non-absorbent ink, and using the method just described for obtaining undulations of varying degree, it is possible to produce a film such that the regions which are undulated to a greater degree appear to be more deeply colored, because of the presence of the more closely spaced segments of the coloring material opposite such regions. A new artistic medium is thus created. In reproducing pictures, dark or deeply colored portions of a picture may be represented by pronounced undulations, and if desired, may be densely colored correspondingly, with strikingly beautiful effects.

If desired, it is possible to use a series of rollers such as 26 and to use differently colored inks, thereby producing a film having a multicolored embedded design.

It is also posssible to include in either the substance which forms the design or the substance which forms the main body of the film, or in both, a phosphorescent or a fluorescent material. The design could include an opaque material if desired so as to mask or diminish the transmission of light from the other material as seen from one side of the film.

One of the features of the film produced by the present invention is that, as illustrated in the attached drawings, the design of non-absorbent ink may be actually embedded in the film, having an exposed side flush with the surface of the film on that side. A further feature is that the method does not involve applying the swelling agent to only the region where undulations are desired; in fact, the swelling agent is applied to the entire upper surface of the dispersion. This has several advantages; it is convenient, it produces in regions which are not undulated a film which is unusually smooth and glossy, and it produces a film in which the boundaries of the undulated region very sharply correspond to the boundaries of the design.

It is to be understood that while one type of absorbent carrier has been described, the teachings of the invention are not limited to such a carrier. Thus various types of base webs may be used, as well as various types of porous, permanently-adhering coatings thereon. The permanently-adhering coating may have different compositions in different regions thereof, and if it is more porous in some regions than in others, a carrier may thereby be provided which is more absorbent in some regions than in others. By applying a layer of dispersion thereover, and applying a swelling agent to this layer, film may be produced having undulations opposite the less absorbent region of the carrier and little or no undulations opposite the more absorbent region of the carrier.

Similar effects may be produced by other means for providing a carrier of different absorptive properties in different regions, such as by applying an absorbent substance to certain regions of a base web but not to others.

The designs formed by the teachings of the present invention may, as previously indicated, be quite varied. It is possible to form, for example, a series of labels, including lettering if desired, by forming a series of same in a large sheet, and severing the sheet into individual labels.

Application Serial No. 656,432, filed March 22, 1946, in the name of Marc A. Chavannes, inventor, discloses and claims certain features relating to the production of film bearing embedded designs, and the like. That application, however, does not specifically claim the use of an absorbent carrier together with the steps specified herein for producing contrasting surface conditions on the surface of the film opposite the embedded designs.

While a suitable form of apparatus and mode of procedure, to be used in accordance with the invention, and various improved products resulting therefrom have been described in some detail, and certain modifications have been suggested, it will be understood that numerous changes may be made without departing from the general principles and scope of the invention.

We claim:

1. A method of producing a flexible film having on one face an undulated area, comprising the steps of applying a design layer of a relatively non-absorbent film-forming substance to a related area of an absorbent carrier, applying a continuous layer of a film-forming substance to said carrier and over said design layer, applying a swelling agent to the exposed surface of said continuous layer to cause undulations therein in an area opposite said design layer, drying said layers, and stripping said continuous layer from said carrier.

2. A method of producing flexible film bearing a design of film-like material embedded in one face thereof and having on its opposite face a surface undulated in an area opposite said design, comprising the steps of applying to an absorbent carrier a design of a film-forming substance, applying a continuous smooth layer of a film-forming substance to said carrier and over said first-mentioned film-forming substance, applying a swelling agent to the exposed surface of said last applied layer, drying said layers, and stripping said last applied layer together with said design embedded therein from said carrier.

3. A method of producing a flexible film having on one face an undulated area, comprising the steps of applying to a carrier a layer of a substance capable of providing a smooth absorbent surface, applying a design layer of substantially uniform thickness of a relatively non-absorbent film-forming material to a limited area of said first applied layer, applying over said design layer a continuous layer of a film-forming substance to form the main portion of said film, applying a swelling agent to the exposed surface of the last applied layer to cause undulations in the surface area opposite said design layer, drying said layers, and stripping said layers from said carrier.

4. A method of producing a flexible film having on one face an undulated area, comprising the steps of applying a continuous layer of a film-forming substance to a carrier which is less absorbent in at least one area than in other areas, applying a swelling agent to the exposed surface of said layer, drying said layer, and stripping said layer from said carrier.

5. A method of producing a flexible film having on one face an undulated area, comprising the steps of forming a carrier which is less absorbent in at least one area than in other areas, applying to said carrier a layer of a film-forming substance, applying a swelling agent to the exposed surface of said layer so as to cause undulations therein in the area opposite said less absorbent area of said carrier, drying said layer, and stripping said layer from said carrier.

6. A method of producing a flexible film which in a first series of areas is highly transparent, smooth and glossy and in other areas is undulated, comprising the steps of preparing an absorbent carrier, applying to selected areas of said carrier a layer of a material capable of rendering said carrier relatively non-absorbent, applying over said layer a continuous layer of a film-forming substance, applying a swelling agent to the exposed surfaces of said last-applied layer so as to cause undulations in the exposed surface of said layer opposite said relatively non-absorbent areas of said carrier, drying said layers, and stripping said layers from said carrier.

7. A method of producing a flexible film having on one side different degrees of smoothness in different areas comprising the steps of applying absorbent material irregularly to a carrier so as to cause certain areas thereof to be more absorbent than other areas, applying over said carrier a continuous layer of a film-forming substance, applying a swelling agent to the exposed surface of said last-applied layer so as to cause different degrees of smoothness in various areas of the exposed surface thereof, drying said layer of film-forming substance, and stripping same from said carrier.

8. A method of producing a flexible film having on one face an undulated region and having on the other face an indented region opposite said undulated region, comprising the steps of applying to an absorbent carrier in an area thereof a design of a relatively non-absorbent film-forming substance having an adhesive affinity for said carrier, applying a continuous layer of a film-forming substance to said carrier over said design, applying a swelling agent to the exposed surface of said continuous layer, drying said layers, and stripping said continuous layer from said design and from said carrier.

9. A method of forming labels bearing designs including lettering comprising the steps of applying a relatively non-absorbent film-forming substance to selected areas of a relatively absorbent carrier having the shapes of the designs desired on said labels, drying said substance, applying over said substance and to said carrier a continuous layer of a film-forming substance, applying a swelling agent uniformly to the exposed surface of said layer, drying and fusing said layer, stripping said layer from said carrier, and severing said layer into a plurality of labels.

10. A method of producing a flexible film from a dispersion of a resin in a vehicle, said film having one face undulated in certain areas, said method comprising the steps of applying to an absorbent paper carrier a substance which when dried has pores through which said vehicle may pass but to which substance said dispersion when dried will but lightly adhere, applying a layer of a relatively non-absorbent film-forming substance to an area of said first-applied layer so as to render this area less absorbent for said vehicle, applying over said relatively non-absorbent substance and over said absorbent substance a continuous layer of a film-forming substance, applying a swelling agent to the exposed surface of said continuous layer, drying said layers, and stripping said layers from said carrier.

11. A method of producing a flexible film having on one face an undulated area, comprising the steps of applying to an absorbent carrier a layer comprising clay, casein, and glycerine capable of providing a smooth, absorbent surface, applying a design layer of a relatively non-absorbent film-forming material to an area of said first applied layer to render this area less absorbent, applying over said design layer a continuous layer of a film-forming substance to form the main portion of said film, applying a swelling agent to the exposed surface of the last-applied layer to cause undulations in the surface area opposite said design layer, drying said layers, and stripping said layers from said carrier.

12. A method of producing a flexible film having on one face an undulated area, comprising the steps of applying a design layer of a relatively non-absorbent, film-forming substance to an area of an absorbent carrier, applying a continuous layer of a dispersion comprising a vinyl resin and a vehicle to said carrier and over said design layer, applying a swelling agent to the exposed surface of said continuous layer to cause undulations therein in an area opposite said design layer, drying said layers, and stripping said continuous layer from said carrier.

13. A method of producing a flexible film having on one face an undulated area comprising the steps of applying a design layer of a relatively non-absorbent film-forming substance to an area of an absorbent carrier, applying a continuous layer of a dispersion comprising a copolymer of vinyl acetate and vinyl chloride, a plasticizer, and a diluent to said carrier and over said design layer, applying a swelling agent to the exposed surface of said continuous layer to cause undulations therein in an area opposite said design layer, drying said layers, and stripping said continuous layer from said carrier.

14. A method of producing a flexible film having on one face an undulated area comprising the steps of applying a design layer of a relatively non-absorbent film-forming substance to an area of an absorbent carrier, applying a continuous layer of a dispersion comprising a vinyl resin and a plasticizer, the ratio by weight of said plasticizer to said vinyl resin being greater than 0.15 to 1 and less than 1.10 to 1, to said carrier and over said design layer, applying a swelling agent to the exposed surface of said continuous layer to cause undulations therein in an area opposite said design layer, drying said layers, and stripping said continuous layer from said carrier.

15. A method of producing a flexible film having on one face an undulated area, comprising the steps of applying a design layer of a relatively non-absorbent film-forming substance to an area of an absorbent carrier, applying a continuous layer of a dispersion comprising a vinyl resin and a plasticizer to said carrier and over the exposed surface of said design layer, applying to said dispersion a swelling agent comprising a solvent for said resin to cause undulations therein in an area opposite said design layer, drying said layers, and stripping said continuous layer from said carrier.

16. A method of producing a flexible film having on one face an undulated area, comprising the steps of applying to an absorbent carrier a plurality of designs of film-forming substance, said substance including at least one non-absorbent component, applying over said designs a continuous layer of a film-forming substance, applying a swelling agent to the exposed surface of said continuous layer, drying said layer, and stripping said layer from said carrier.

17. A method of producing a flexible film having on one face an undulated area, comprising the steps of applying a design layer of a relatively non-absorbent film-forming substance to an area of an absorbent carrier, applying a continuous layer of a film-forming substance to said carrier and over said design layer, at least one of said layers including a pigmenting agent, applying a swelling agent to the exposed surface of said continuous layer to cause undulations therein in an area opposite said design layer, drying said layers, and stripping said continuous layer from said carrier.

18. A method of producing a flexible film having on one face an undulated area, comprising the steps of applying a design layer of a relatively non-absorbent film-forming substance to an area of an absorbent carrier, applying a continuous layer of a film-forming substance to said carrier and over said design layer, at least one of said layers including a substance capable of emitting light in the absence of incident visible illumination, applying a swelling agent to the exposed surface of said continuous layer to cause undulations therein in an area opposite said design layer, drying said layers, and stripping said continuous layer from said carrier.

19. A method of producing flexible film having on one face an undulated area, comprising the steps of coating a non-absorbent carrier in certain regions with an absorbent substance, leaving an uncoated region, applying to the coated and uncoated regions of said carrier a layer of a film-forming substance, applying a swelling agent to the exposed surface of said last-applied layer so as to cause surface undulations therein in an area opposite the uncoated region of said carrier, drying said layer, and stripping said layer from said coated carrier.

20. A method of producing a flexible film having on one face an undulated area, comprising the steps of applying to a carrier in different regions substances which have different absorptive properties, so that in at least one region the coated carrier will be less absorbent than in other regions, applying over said coated carrier a continuous layer of a film-forming substance, applying a swelling agent to said layer so as to cause undulations in its surface opposite said less absorbent region, drying said layer, and stripping said layer from said carrier.

21. A method of producing a self-sustaining, flexible film comprising a supporting portion, a plurality of spaced design portions embedded in one side thereof, and having on the surface opposite said design portions undulations of varying degree in various regions, said method comprising steps of applying small, spaced, design portions of non-absorbent substance to a first area and to a second area of a carrier so that the aggregate area of said carrier covered up by said design portions is greater in said first area than in said second area, applying over said carrier and said design portions a continuous layer of a film-forming substance, applying a swelling agent to the exposed surface of said last-applied layer to cause relatively deep undulations in said first area and relatively shallow undulations in said second area, drying said layer, and stripping the same, together with said design portions, from said carrier.

MARC A. CHAVANNES.
ARTHUR B. SHERRY.

REFERENCES CITED

The following references are of record in the file of this patent:

UNITED STATES PATENTS

| Number | Name | Date |
| --- | --- | --- |
| 2,022,587 | Cunningham | Nov. 26, 1935 |
| 2,066,596 | West | Jan. 5, 1937 |
| 2,269,521 | Darrah | Jan. 13, 1942 |
| 2,374,308 | Rooney et al. | Apr. 24, 1945 |
| 2,383,047 | Dreyfus | Aug. 21, 1945 |

Patent No. 2,482,094

Certificate of Correction

September 20, 1949

MARC A. CHAVANNES ET AL.

It is hereby certified that errors appear in the printed specification of the above numbered patent requiring correction as follows:

Column 8, line 5, for "swilling" read *swelling*; column 11, line 57, for the word "related" read *selected*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*